UNITED STATES PATENT OFFICE.

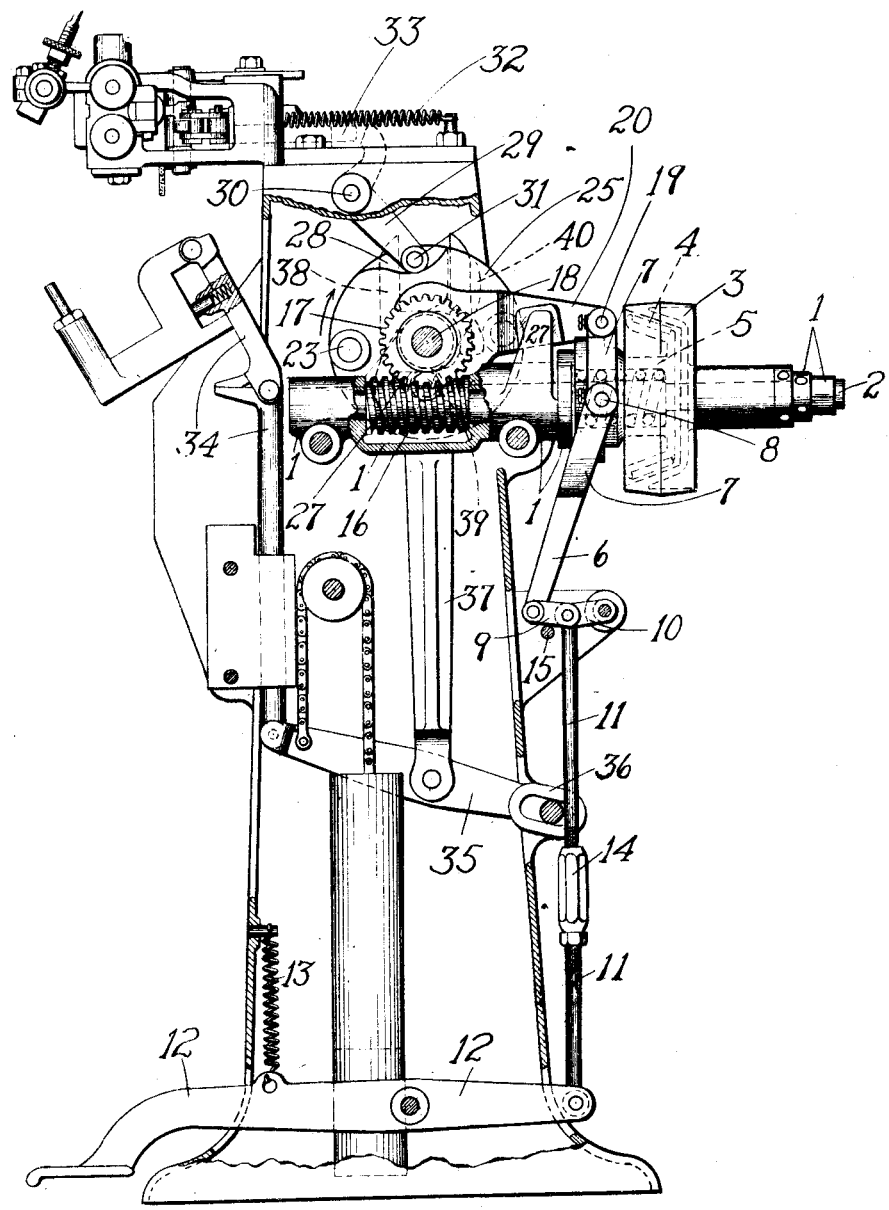

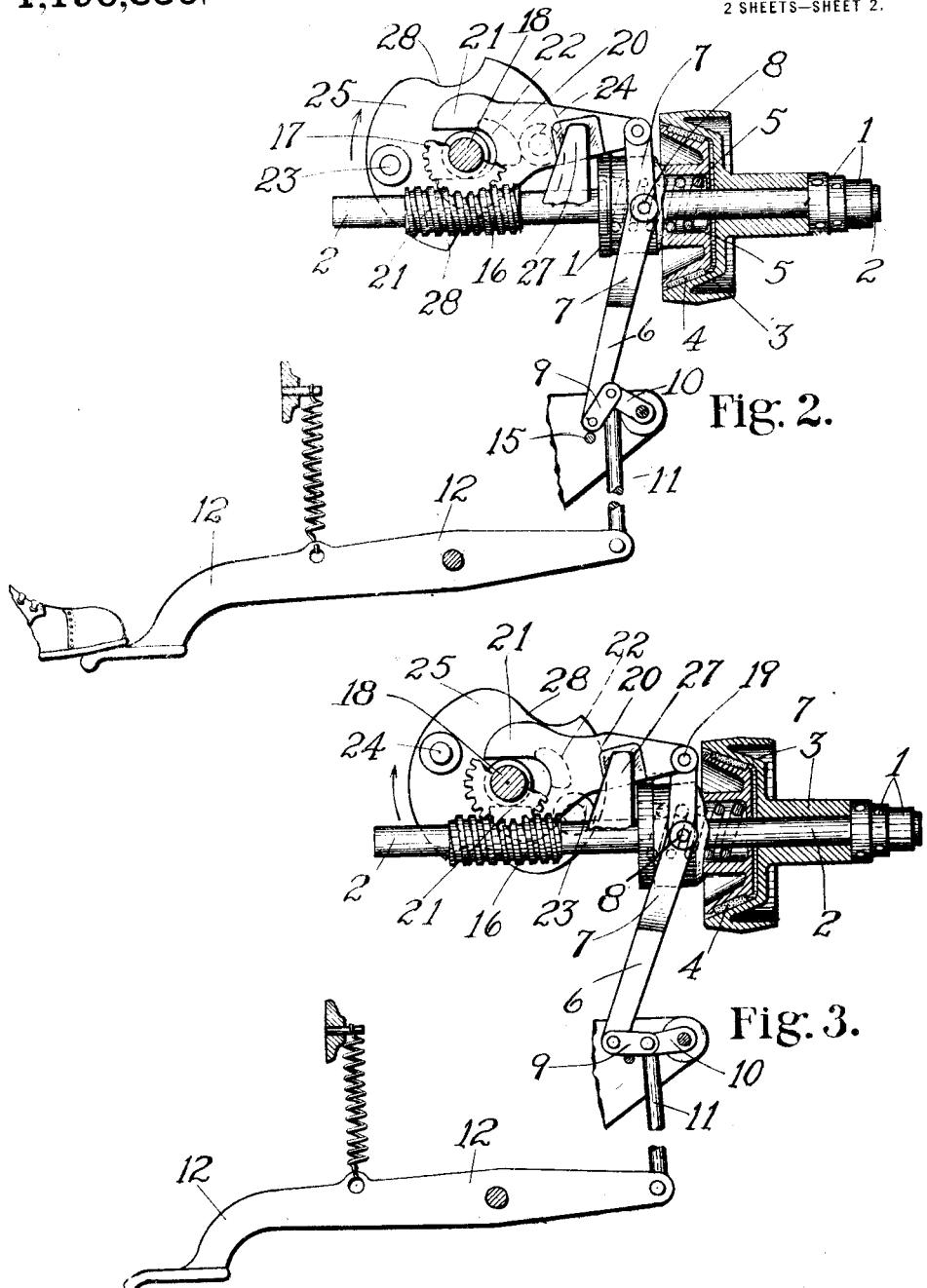

JOHN MILTON BENJAMIN, OF BEVERLY, MASSACHUSETTS, ASSIGNOR TO UNITED SHOE MACHINERY COMPANY, OF PATERSON, NEW JERSEY, A CORPORATION OF NEW JERSEY.

STARTING AND STOPPING MECHANISM.

1,196,836.

Specification of Letters Patent.

Patented Sept. 5, 1916.

Application filed May 29, 1915. Serial No. 31,240.

*To all whom it may concern:*

Be it known that I, JOHN M. BENJAMIN, a citizen of the United States, residing at Beverly, in the county of Essex and State of Massachusetts, have invented certain Improvements in Starting and Stopping Mechanisms, of which the following description, in connection with the accompanying drawings, is a specification, like reference characters on the drawings indicating like parts in the several figures.

This invention relates to starting and stopping mechanisms and more particularly to that type of mechanism wherein a clutch is disengaged, at a predetermined period in the cycle of operations of a machine, by an operating mechanism, the action of which is transmitted to the clutch through certain appropriate transmission devices. Commonly, a machine employing such mechanism is operated by permitting a spring or like agency to move the clutch into operative or engaging position; and such a machine is automatically stopped at a predetermined point, such as the end of a work cycle, by certain transmission devices operating against the clutch. Such a type of starting and stopping mechanism is particularly useful in connection with machines wherein it is desired to stop the operating parts always in a predetermined position.

The present invention has for its objective the provision of improved starting and stopping mechanism of this general type, whereby accuracy in the starting and stopping operations is assured and accidental operation is prevented.

To this end, the invention, among other features, includes the combination with a driven work shaft, a driving means and a movable clutch element for operatively connecting the two, of clutch operating devices having connection with the clutch member through a floating lever. In connection with such mechanism, means are provided for locking the retracted clutch element against clutching movement until certain manually controlled devices are operated. As another feature, the invention includes in connection with the automatic unclutching operation, a combined unclutching and braking means whereby the clutch member is moved to unclutching position and the driven shaft is thereby coincidently braked, this latter operation resulting in the substantially coincident stoppage of the operating parts. An instance in which such a means may be used to particular advantage is found in machines of the type using a working shaft rotating at a speed substantially reduced relatively to the driving shaft or pulley. In such a machine the working shaft rotates relatively slowly and my combined unclutching and braking means may coöperate with such a shaft without danger of overthrow of the controlling parts when the machine is stopped by unclutching and braking.

The invention, as shown and described herein, is illustrated and described, but not claimed, in my co-pending application for last pulling machine, filed March 10, 1915 under Serial No. 13,385 and for the purposes of illustration, I have herein shown a preferable embodiment of my invention in connection with the operative parts of a last pulling machine of the type of the aforesaid application. Nothing herein contained is to be construed, however, as limiting this invention, in its application, to use in a machine with devices such as shown in said application or in a machine with devices of a similar character, and in the following detailed description it is to be understood that the illustration and associated descriptive matter refer to a preferred embodiment which is used for the purposes of exemplification only.

Accordingly, the scope of the invention is to be determined by the broadest construction of the terms of the claims permitted by the prior art.

In the accompanying drawings: Figure 1 is a side elevation, partly in section, of a clutch mechanism and associated machine parts illustrating a preferred form of the invention, the clutch being shown as held in disengaged position, ready for the initiation of a working cycle through the manual control; Fig. 2 is a fragmentary view in side elevation of the clutch parts in the positions they occupy with the clutch moved into clutching position; Fig. 3 is a similar view, but with the parts in the positions they occupy immediately preceding automatic unclutching operation, the manually controlled devices being positioned for locking function.

In the illustrated embodiment of the invention, the parts are supported within a heavy upright column having in its upper part a bearing sleeve 1, in which is journaled a driven shaft 2. This shaft 2 carries a loose pulley 3 intended for connection to a source of power and forming the driving element of the machine. This pulley is provided on one face with a clutch surface formed to be engaged by a cone clutch element 4 splined on the driven shaft 2 and normally tending to move into clutching engagement with the pulley 3 under the action of a compression spring 5. This spring is mounted preferably within the hub of the clutch member 4 and is held between the clutch member and a portion of the shaft bearing 1. This spring is permitted to move the clutch member 4 into clutching engagement through the controlled action of a floating lever 6 having a yoke 7 embracing and journaled upon trunnions 8 carried by the hub of the clutch element. The lower end of this lever 6 is pivotally attached to one end of a toggle formed by the links 9—10, the end of link 10 being pivoted to the machine frame. A toggle operating rod 11 depends from the point of pivotal interconnection of these toggle links and has its lower end pivotally connected to a manually operated device in the form of a treadle 12, the spring 13 normally tending to lift this treadle and pull the rod 11 downwardly so that the links 9 and 10 have their pivot points in substantial alinement. In order to prevent these links from being moved downwardly beyond effective locking alinement, a stop pin 15 is carried upon the frame of the machine. Adjustment of the length of the rod 11 is provided for by an appropriate means, such as the turn-buckle 14.

The driven shaft 2 carries a worm 16 fixed thereon and meshing with a worm gear 17 carried by a counter or work shaft 18 which is therefore rotated at reduced speed. This work shaft 18 is utilized to retract the clutch at the end of a work cycle. To this end, a link 20 is provided, to one end of which the upper end 7 of the clutch lever is pivotally connected. The opposite and inner end of this link is forked, its arms 21 being guided by the hub of a cam disk 25 carried by and rotating with the work shaft so that the link has a sliding movement forwardly and backwardly parallel to the driven shaft 2. On one of its side faces, the link 20 is provided with a projection 22, the outer edge face of which is eccentric to the axis of the shaft 18 and is normally positioned to be engaged by one or the other of rolls 23, 24 carried on the adjacent face of the cam disk 25. The construction is such that the cam or work shaft 18 makes one half of a revolution for each complete work cycle of the machine. The link 20 is suitably guided in its sliding movement by guideways or ears 27 upstanding from the bearing 1 in which the driven shaft turns.

With this construction in mind, and referring particularly to Fig. 1 of the drawings, it will be seen that the actuation of the treadle 12 by the operator breaks the lock against the operation of the spring 5 which is afforded by the alined toggle links 9—10, permitting this spring to swing the floating lever 6 forwardly with the clutch, this lever swinging upon its upper pivot end as a fulcrum, and the parts occupying the positions illustrated in Fig. 2 of the drawings. This will couple the driving pulley to the driven shaft 2 and through the worm gearing rotate the cam 25, the roller 24 carried thereby riding over the projection 22 of link 20 and the complemental roller 23 turning with the cam a half revolution. The passage of the roller 24 beyond projection 22 permits the outward sliding movement of the link 20 to place its projection 22 in the path of the roller 23, as suggested in Fig. 3. This outward movement of the link is automatically effected, through compression of the spring 5 acting against the lever 6.

Just before the end of a half revolution of the cam 25, the roller 23 will engage the edge of the projection 22 and exert inward pressure thereagainst, tending, through link 20 and lever 6, to move the clutch inwardly against the force of the compression spring 5 and into inoperative position. In this movement, the fulcrum of the floating lever 6 has been shifted from its upper end to its lower end by reason of the automatic return of the toggle links to alined locking position, thereby fixing the position of the lower end of the lever. When the roll 23, therefore, bears against the edge of the projection 22 of link 20, it will pull upon the lever 6 to retract the clutch member 4, the lever 6 fulcruming upon its lower end as before stated. This action will disconnect the driven shaft from the driving shaft and compression of the clutch spring 5, acting outwardly through the edge of projection 22 and against roller 23, will function as a braking force and will stop rotation of the cam disk and rollers coincidently with the retraction of the clutch member 4, the parts assuming the positions shown in Fig. 1 and in such positions being ready for the initiation of another cycle of operations through depression of the treadle 12. As the driven shaft rotates at a substantially reduced speed the tension of the spring 5 acting against the driven shaft, will be sufficient to present the rolls 23—24 from running over and beyond the projection 22 as the clutch is withdrawn.

In the illustrated machine, a cycle of operations is represented by the following instrumentalities. The periphery of the cam 25 at diametrically opposite points is provided with relatively low parts 28. A bell crank 29 journaled in the frame at 30 has its lower arm provided with a roller 31 riding on the periphery of the cam 25. The upper end of this bell crank engages and intermittently thrusts to the left (Fig. 1) and against the pull of a return spring or springs 32, a shoe gripping member 33, the construction of which need not be herein described. When the roller 31 rests in the depressed portions 28 of the cam, the bell crank will be retracted from gripping position and when riding upon the high points of the periphery of the cam, will be thrust forward into gripping position, there being two forward and two retracted positions to a complete revolution of the cam. A last pulling instrumentality is indicated generically at 34, the lower end of the bar shown being pivotally connected to one end of a transverse lever 35 fulcruming on the frame at 36 and having connected thereto intermediate its ends, an operating arm 37. This operating arm has its upper arm forked as at 38 and guided upon the hub of the cam 25. It also carries in addition a roll 39 adapted to be engaged by a pair of suitable wiper cams suggested at 40 in Fig. 1. These cams depress the actuating bar 37 to pull the last extracting element 34 downwardly, the latter being normally raised through a counter weight. It is unnecessary herein to describe the action and construction of these work instrumentalities, inasmuch as specifically they form no part of the present invention. A more detailed showing thereof will be found in my co-pending application aforesaid.

Having described my invention, what I claim as new and desire to secure by Letters Patent of the United States is:—

1. Starting and stopping mechanism having, in combination, a driven shaft, a driving means, a movable clutch element for operatively connecting said shaft and driving means, means normally tending to move said element to clutching shaft-driving position, and connections between said clutch element and said driven shaft automatically operated through said driven shaft to move said clutch element to unclutching position, said connections including a floating lever carried by and moving with said clutch element.

2. Starting and stopping mechanism having, in combination, a driven shaft, a driving means, a movable clutch element for operatively connecting said shaft and driving means, means normally tending to move said element to clutching shaft-driving position, means normally positioned to block such clutching action and manually operable to release said clutch operating means, and connections between said clutch element and said driven shaft automatically operated through said driven shaft to move said clutch element to unclutching position, said connections including a floating lever carried by and moving with said clutch element.

3. Starting and stopping mechanism having, in combination, a driven shaft, a driving means, a movable clutch element for operatively connecting said shaft and driving means, means normally tending to move said element to clutching shaft-driving position, means normally positioned to block such clutching action and manually operable to release said clutch operating means, and connections between said clutch element and said driven shaft automatically operated through said driven shaft to move said clutch element to unclutching position, said connections including a floating lever carried by and moving with said clutch element and having a shifting fulcrum.

4. Starting and stopping mechanism having, in combination, a driven shaft, a driving means, a movable clutch element for operatively connecting said shaft and driving means, means normally tending to move said element to clutching shaft-driving position, means normally positioned to block such clutching action and manually operable to release said clutch operating means, and connections between said clutch element and said driven shaft automatically operated through said driven shaft to move said clutch element to unclutching position, said connections including a floating lever carried by and moving with said clutch element and in operative connection with said driven shaft, and said manually controlled blocking means.

5. Starting and stopping mechanism having, in combination, a driven shaft, a driving means, a movable clutch element for operatively connecting said shaft and driving means, means normally tending to move said element to clutching shaft-driving position, means normally positioned to block such clutching action and manually operable to release said clutch operating means, and connections between said clutch element and said driven shaft automatically operated through said driven shaft to move said clutch element to unclutching position, said connections including a floating lever carried by and moving with said clutch element and having a fulcrum automatically shifting with the clutching and releasing action.

6. Starting and stopping mechanism having, in combination, a driven shaft, a driving means, a movable clutch element for operatively connecting said shaft and driving means, means normally tending to move said element to clutching shaft-driving position, means normally positioned to block such clutching action and manually operable to release said clutch operating means, and connections between said clutch element and said driven shaft automatically operated through said driven shaft to move said clutch element to unclutching position, said connections including a floating lever carried by and moving with said clutch element in operative connection with said driven shaft and said manually controlled blocking means, and having a fulcrum automatically shifting with the clutching and releasing action.

7. Starting and stopping mechanism having, in combination, a driven shaft, a driving means, a movable clutch element for operatively connecting said shaft and driving means, means normally tending to move said element to clutching shaft-driving position, a lever carried by and moving with said clutch element, means connected with said lever adjacent one end thereof normally positioned to latch said end against movement, with manually controlled means for releasing said lever end to permit said clutch to move to operative position, and with means in operative connection with said lever adjacent its other end automatically operated through said driven shaft at the completion of a work cycle to move said lever in a direction to move said clutch into inoperative position.

8. Starting and stopping mechanism having, in combination, a clutch, a shaft driven thereby, means normally tending to move the clutch to drive the shaft, and a combined clutch retracting and shaft braking means automatically operated to move the clutch to inoperative position and to coincidently break and stop the rotation of said driven shaft by the resistance offered to said movement of the clutch.

9. Starting and stopping mechanism having, in combination, a clutch, a shaft driven thereby, means normally tending to move the clutch to drive the shaft and a combined clutch retracting and shaft braking means automatically operated through said driven shaft upon the completion of a work cycle to move the clutch to inoperative position and to coincidently brake and stop the rotation of said driven shaft by the resistance offered to said movement of the clutch.

10. Starting and stopping mechanism having, in combination, a clutch, a shaft driven thereby, means normally tending to move the clutch to drive the shaft, means normally operative to latch the clutch against such movement with manually controlled means to release said clutch to drive the shaft, and combined clutch retracting and shaft braking means automatically operated through said driven shaft to move the clutch to inoperative position and to coincidently brake and stop the rotation of said driven shaft by the resistance offered to said movement of the clutch.

11. Starting and stopping mechanism having, in combination, a clutch, a shaft driven thereby, means normally tending to move the clutch to drive the shaft, and a combined clutch retracting and shaft braking organism, automatically operated through said driven shaft upon the completion of a work cycle to retract the clutch, said organism operating to brake the driven shaft coincidently with clutch retraction through the resistance offered to retraction of said clutch.

12. Starting and stopping mechanism having, in combination, a clutch, a shaft driven thereby, spring means normally tending to move the clutch to drive the shaft, and a combined clutch retracting and shaft braking organism automatically operated through said driven shaft upon the completion of a work cycle to retract the clutch, said organism acting against the driven shaft to brake and stop rotation of said shaft through the resistance of said clutch moving spring to clutch retracting movement.

13. Starting and stopping mechanism having, in combination, a clutch, a shaft driven thereby, spring means to move the clutch to drive the shaft and a clutch-retracting organism automatically controlled from the driven shaft and operating against the force of said clutch spring to retract the clutch and to brake and stop the driven shaft through the resistance of the clutch spring.

14. Starting and stopping mechanism having, in combination, a clutch, a shaft driven thereby, a second and work shaft, reducing gearing connecting said shafts, to reduce the speed of rotation of the work shaft means to move the clutch to drive the shafts, and a combined clutch retracting and work shaft braking organism automatically controlled from said work shaft to retract the clutch from shaft driving position and to brake and stop coincidently rotation of said work shaft through the resistance offered to clutch retraction.

15. Starting and stopping mechanism having, in combination, a clutch, a shaft driven thereby, a second and work shaft, reducing gearing connecting said shafts to reduce the speed of rotation of said work shaft, spring means for moving the clutch to a position to drive said shafts, and combined clutch retracting and work shaft braking means automatically controlled from said work shaft to retract the clutch from shaft driving position against the force of said spring means and to brake and stop coincidently rotation of said work shaft through the spring resistance offered to clutch retraction.

16. Clutch operating means for starting and stopping mechanisms comprising in combination with a clutch, a shaft and means normally tending to move the clutch to drive the shaft, a lever pivotally carried by the clutch intermediate of its ends and moving with the clutch, a link connected to the lever adjacent to one end of the lever and mounted to move to and fro to operate the clutch and means for moving the link from the driven shaft.

17. Clutch operating means for starting and stopping mechanisms comprising in combination with a clutch, a shaft and means normally tending to move the clutch to drive the shaft, a lever pivotally carried by the clutch intermediate of its ends and moving with the clutch, a link pivotally connected to one end of the lever and mounted to move to and fro to operate the clutch, manually-released means coöperating with the other end of said lever to hold the clutch in inoperative position, and means controlled from said driven shaft for automatically moving said link to operate said lever and move the clutch from operative to inoperative position.

18. A machine organization having in combination, a driving shaft, a driven shaft, operating connections between said shafts including a clutch with means normally tending to move said clutch to connect said shafts and intermediate reducing gearing to reduce the speed of the driven shaft substantially below the speed of the driving shaft, connections between the clutch and the driven shaft automatically operated at a predetermined point in the rotation of the driven shaft to retract the clutch from operative connection with the driving shaft, said connections being constructed and arranged to brake and stop rotation of the driven shaft through braking action on said clutch and driven shaft connections by the resistance offered to clutch retraction.

19. A machine organization having in combination, a driving shaft, a driven shaft, a clutch having spring means normally tending to move and hold the clutch in operative connection with the driving shaft and having permanent driving connection with said driven shaft, including intermediate reducing gearing arranged to reduce the speed of rotation of the driven shaft substantially below the speed of rotation of the driving shaft, and clutch retracting connections between the driven shaft and the clutch arranged to be automatically operated from the driven shaft against the force of the clutch spring to retract the clutch from operative connection with the driving shaft and to brake and stop rotation of the driven shaft through the drag on said shaft of the spring resistance to clutch retraction.

In testimony whereof I have signed my name to this specification.

JOHN MILTON BENJAMIN.